(12) United States Patent
Ban et al.

(10) Patent No.: US 9,367,182 B2
(45) Date of Patent: Jun. 14, 2016

(54) PANEL OPERATING APPARATUS

(75) Inventors: Hee Jeong Ban, Ansan-si (KR); Jae-Hyuk Chang, Ansan-si (KR); Hyun-Seok Kim, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 635 days.

(21) Appl. No.: 13/142,231

(22) PCT Filed: Dec. 30, 2009

(86) PCT No.: PCT/KR2009/007933
§ 371 (c)(1),
(2), (4) Date: Jun. 24, 2011

(87) PCT Pub. No.: WO2010/077081
PCT Pub. Date: Jul. 8, 2010

(65) Prior Publication Data
US 2011/0254793 A1   Oct. 20, 2011

(30) Foreign Application Priority Data

Dec. 31, 2008  (KR) .................... 10-2008-0138234

(51) Int. Cl.
*G06F 3/041* (2006.01)
*G06F 3/044* (2006.01)
(Continued)

(52) U.S. Cl.
CPC *G06F 3/044* (2013.01); *G06F 3/02* (2013.01); *G06F 3/0202* (2013.01); *G06F 3/041* (2013.01);
(Continued)

(58) Field of Classification Search
CPC ......... G06F 3/02; G06F 3/0202; G06F 3/041; G06F 3/044; H01H 13/705; H01H 13/70; H01H 13/702; H01H 13/14; H01H 3/12

USPC .......................................................... 345/173
See application file for complete search history.

(56) References Cited

U.S. PATENT DOCUMENTS

| | | | | |
|---|---|---|---|---|
| 5,313,027 A | * | 5/1994 | Inoue et al. .................... | 200/5 A |
| 6,639,159 B2 | * | 10/2003 | Anzai .......................... | 200/1 B |

(Continued)

FOREIGN PATENT DOCUMENTS

| | | |
|---|---|---|
| JP | 2005-316931 | 11/2005 |
| JP | 2007-335135 | 12/2007 |

(Continued)

OTHER PUBLICATIONS

International Search Report for PCT/KR2009/007933 issued on Aug. 19, 2010.

(Continued)

*Primary Examiner* — Latanya Bibbons
(74) *Attorney, Agent, or Firm* — H.C. Park & Associates, PLC

(57) ABSTRACT

Disclosed is a panel operating apparatus. The panel operating apparatus changes a state of a display device electrically connected to a circuit board located below a panel. The panel operating apparatus includes a tact member mounted on the circuit board, and a resilient member electrically connected to a circuit pattern of the circuit board and separated from the panel and the circuit board. The resilient member is selectively brought into contact with the panel or the tact member depending on a degree of pressure applied to the panel, thereby allowing the apparatus to be operated in a tact manner when the apparatus cannot be operated in a touch manner due to individual features of operators or external conditions.

15 Claims, 2 Drawing Sheets

(51) Int. Cl.
- *H01H 13/705* (2006.01)
- *H01H 3/12* (2006.01)
- *H01H 13/70* (2006.01)
- *G06F 3/02* (2006.01)
- *H01H 13/14* (2006.01)
- *H01H 13/702* (2006.01)

(52) U.S. Cl.
CPC ............... *H01H 3/12* (2013.01); *H01H 13/14* (2013.01); *H01H 13/70* (2013.01); *H01H 13/705* (2013.01); *H01H 13/702* (2013.01)

(56) References Cited

U.S. PATENT DOCUMENTS

| | | | |
|---|---|---|---|
| 7,339,577 B2 * | 3/2008 | Sato et al. | 345/173 |
| 7,635,819 B2 * | 12/2009 | Lee et al. | 200/313 |
| 8,269,124 B2 * | 9/2012 | Jung et al. | 200/513 |
| 2002/0000976 A1 * | 1/2002 | Salminen et al. | 345/169 |
| 2005/0007339 A1 * | 1/2005 | Sato | 345/156 |
| 2009/0085892 A1 * | 4/2009 | Ishikura et al. | 345/174 |
| 2009/0179872 A1 * | 7/2009 | Tatehata et al. | 345/175 |
| 2010/0092270 A1 * | 4/2010 | Adams | 414/427 |
| 2011/0148766 A1 * | 6/2011 | Huang | 345/168 |

FOREIGN PATENT DOCUMENTS

| | | |
|---|---|---|
| KR | 10-2006-0082216 | 7/2006 |
| KR | 10-2008-0023871 | 3/2008 |
| KR | 10-2008-0064260 | 7/2008 |
| WO | 2007099733 | 9/2007 |
| WO | 2007-138982 | 12/2007 |

OTHER PUBLICATIONS

Written Opinion for PCT/KR2009/007933 issued on Aug. 19, 2010.

* cited by examiner

PANEL OPERATING APPARATUS

CROSS-REFERENCE TO RELATED APPLICATIONS

This application is the National Stage Entry of International Application PCT/KR2009/007933, filed on Dec. 30, 2009, and claims priority from and the benefit of Korean Patent Application No. 10-2008-0138234, filed on Dec. 31, 2008, both of which are incorporated herein by reference for all purposes as if fully set forth herein.

BACKGROUND OF THE INVENTION

1. Field of the Invention

The present disclosure relates to a panel operating apparatus and, more particularly, to a panel operating apparatus that can be operated in one manner selected from a touch manner and a tact manner.

2. Discussion of the Background

Generally, there are various kinds of panel operating apparatuses for changing information of display devices. Panel operating apparatuses are applied not only to various electronic appliances such as refrigerators, washing machines, electric rice cookers, and the like, but also to various mobile communication terminals, such as mobile phones, personal digital assistants (PDAs), navigation terminals, telematics terminals, and the like.

Such a panel operating apparatus can be classified into various types including a touch type. The touch type panel operating apparatus can also be classified into various types, such as a resistive touch type, a surface wave technique-based touch type, a capacitive touch type, and the like.

Particularly, in the capacitive touch type, when pressure is applied to a panel of the apparatus to cause the panel to be brought into contact with a circuit board, a small amount of charges are attracted toward a contact point and measured by circuits on a corner of the panel or on the circuit board to be processed by a controller.

However, in the case where the circuit board with the circuit pattern formed thereon is driven in the touch manner, the panel and the circuit board must be secured to each other using a separate adhesive layer or a screw, thereby deteriorating adhesion stability between the panel and the circuit board.

Further, the capacitive touch type has a problem in that the circuit board must be designed to secure an area for a predetermined pattern.

Further, in operation of the touch type panel operating apparatus, the touch sensitivity varies due to different individual features of operators, such as thickness of fingers, touch pressure, and the like.

Moreover, the touch sensitivity can also be differently exhibited according to use environments, temperature, seasons, and the like. Particularly, when the temperature changes abruptly, components of the apparatus such as integrated circuits and the like are highly likely to malfunction.

On the other hand, a tact type panel operating apparatus has many design restrictions relating to a shape of a switch or a contact method.

Therefore, there is a need to solve the above and other problems of the panel operating apparatus in the art.

SUMMARY OF THE INVENTION

One embodiment of the present disclosure includes a panel operating apparatus that can be operated in a tact manner in the case where the apparatus cannot be operated in a touch manner due to different individual features of operators or external environments.

Another embodiment of the present disclosure includes a panel operating apparatus that can overcome design restrictions of the conventional tact type panel operating apparatus relating to a shape of a switch or a contact method.

A further embodiment of the present disclosure includes a panel operating apparatus that improves operating performance in touch operation and facilitates formation of a contact point in tact operation, thereby enabling both the touch and tact operations.

Still another embodiment of the present disclosure includes a panel operating apparatus that can prevent deterioration in adhesion stability between a circuit board and a panel, which occurs in a conventional touch type panel operating apparatus that secures the panel and the circuit board to each other using a separate adhesive layer, screw or the like.

Still another embodiment of the present disclosure includes a panel operating apparatus that can overcome a problem of a conventional capacitive touch type panel operating apparatus which must secure an area for a predetermined pattern in designing a circuit board.

In accordance with one aspect, a panel operating apparatus for changing a state of a display device electrically connected to a circuit board located below a panel includes: a tact member mounted on the circuit board; and a resilient member electrically connected to a circuit pattern of the circuit board and separated from the panel and the circuit board, the resilient member being selectively brought into contact with the panel or the tact member depending on a degree of pressure applied to the panel.

In accordance with another aspect, a panel operating apparatus for changing a state of a display device electrically connected to a circuit board located below a panel having an opening includes: a tact member mounted on the circuit board in a region where the opening is formed in the panel; a thin film covering the whole opening and at least a portion of a surface of the panel; and a resilient member disposed in the region where the opening is formed, and electrically connected to a circuit pattern of the circuit board and separated from the thin film and the circuit board, the resilient member being selectively brought into contact with the panel or the tact member depending on a degree of pressure applied to the thin film.

Advantageously, the resilient member may have a dome shape.

Advantageously, the resilient member may have a flat dome shape, a center of which has a predetermined flat region.

Advantageously, the thin film may be convex at a portion thereof that covers the opening.

Advantageously, the display device may be one selected from various display devices such as a liquid crystal display (LCD), a light emitting device (LED), a plasma display panel (PDP), and the like.

Advantageously, the resilient member may be soldered to the circuit board.

According to one embodiment, a panel operating apparatus can be operated in a tact manner in the case where the apparatus cannot be operated in a touch manner due to different individual features of operators or external environments.

According to another embodiment, a panel operating apparatus can overcome design restrictions of the conventional tact type panel operating apparatus relating to a shape of a switch or a contact method.

According to a further embodiment, a panel operating apparatus improves operating performance in touch operation while facilitating formation of a contact point in tact operation to thereby permit both the touch and tact operations, and can prevent deterioration in adhesion stability between a circuit board and a panel, which occurs in a conventional touch type panel operating apparatus that secures the panel and the circuit board to each other using a separate adhesive layer, screw or the like.

According to still another embodiment, a panel operating apparatus can overcome a problem of a conventional capacitive touch type panel operating apparatus which must secure an area for a predetermined pattern in designing a circuit board.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION OF THE ILLUSTRATED EMBODIMENTS

Embodiments of the present disclosure will be now described in detail with reference to the accompanying drawings. The following embodiments are given by way of illustration to provide a thorough understanding of the present disclosure to those skilled in the art. Hence, the drawings and the detailed description thereof should not be interpreted to restrict the scope of the present disclosure.

Figure 1:
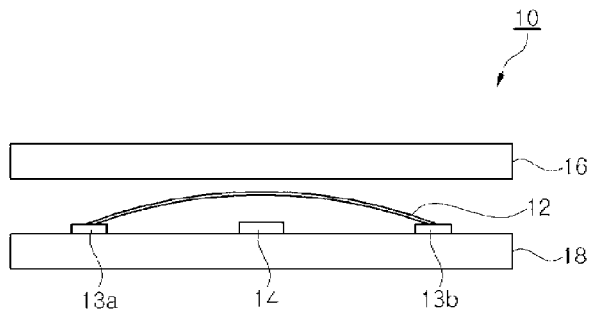
FIG. 1 is a side sectional view of a panel operating apparatus in accordance with one embodiment of the present disclosure.

FIG. 1 is a side sectional view of a panel operating apparatus in accordance with one embodiment of the present disclosure. Referring to FIG. 1, a panel operating apparatus 10 for changing a state of a display device (not shown) electrically connected to a circuit board 18 located below a panel 16 includes a tact member 14 and a resilient member 12.

The tact member 14 is mounted on the circuit board 18 to be brought into contact with the resilient member 12 during operation so as to serve as a contact point for changing a state of the display device (not shown) through post processing by a controller (not shown).

The resilient member 12 is electrically connected to a circuit pattern (not shown) of the circuit board 18 and disposed to be separated from both the panel 16 and the tact member 14. The resilient member 12 may be electrically connected to the circuit pattern of the circuit board 18 via solders 13a and 13b on the circuit board 18.

When pressure is applied to the panel 16 of the apparatus (for example, the panel 16 is pressed by a finger) for manipulation, that is, for changing the state of the display device (not shown) electrically connected to the panel operation apparatus 10, the resilient member 12 may be selectively brought into contact with the panel 16 or the tact member 14 depending on a degree of the pressure applied to the panel 16.

That is, when an operator applies a low pressure to the panel 16 (that is, a degree of pressure when touching the panel), the panel 16 is brought into contact with the resilient member 12 to allow the apparatus 10 to be operated in a touch manner. When the operator applies a greater pressure to the panel 16, the panel 16 is compressed to cause the resilient member 12 to be brought into contact with the tact 14, thereby allowing the apparatus 10 to be operated in a tact manner.

Changing the state of the display device (not shown) electrically connected to the panel operating apparatus 10 may refer to, but is not limited to, operating the panel operating apparatus 10, for example, to set a freezing or refrigerating temperature of a refrigerator when the display device is mounted to the refrigerator, or to set a water temperature, soaking time, washing time, spin drying time, drying time, and the like of a washing machine when the display device is mounted to the washing machine, or the like. Here, it should be noted that the change of the state of the display device mounted to the refrigerator is actually realized as a numerical change according to a luminescent combination of light emitting diodes (LEDs) for displaying temperature.

Further, components operating after the contact between the tact member 14 and the resilient member 12 or after the contact between the panel 16 and the resilient member 12 in a capacitive touch manner operation by contact between the panel 16 and the resilient member 12 are not main features of the present disclosure and can be apparent to a person having ordinary knowledge in the art. Therefore, a description of such components will be omitted herein.

Figure 4:
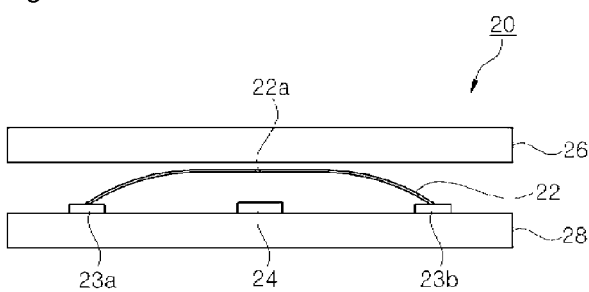
FIG. 4 is a side sectional view of a panel operating apparatus including a different resilient member from the resilient member shown in FIG. 1.

As described above, the resilient member 12 is brought into contact with the panel 16 and/or the tact 14 during operation and may be made of metal or other conductive materials. Further, the resilient member 12 may have a dome shape as shown in FIG. 1, but is not limited thereto. FIG. 4 shows one example of the resilient member 12 that has a flat dome shape in which a predetermined region of a center 22a is flat.

That is, the resilient member 12 is electrically connected to the circuit pattern (not shown) of the circuit board 18 via solders 13a, 13b on the circuit board 18. The resilient member 12 is not limited to a particular shape or material so long as the resilient member 12 has resilience or restoration force so as to be separated a predetermined distance from the panel 16 and the tact member 14 in a non-operation state and can be brought into contact with the panel 16 and/or the tact member 14 in an operation state.

Figure 2:
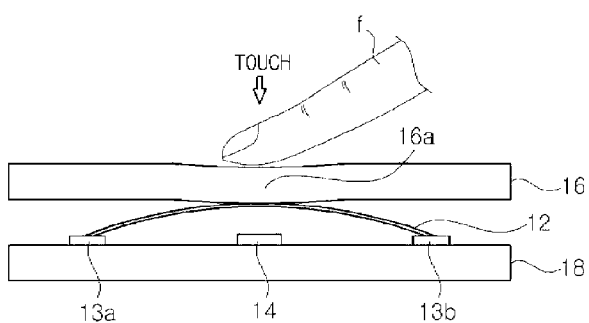
FIG. 2 shows a touch mode of the panel operating apparatus in which pressure is applied to a panel to cause the panel to be brought into contact with a resilient member.
Figure 3:
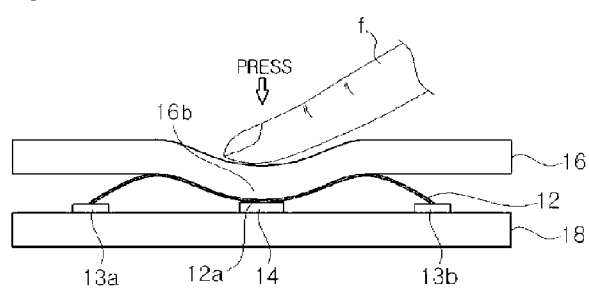
FIG. 3 shows a tact mode of the panel operating apparatus in which pressure is applied to the panel to cause the resilient member to be brought into contact with a tact member.

FIGS. 2 and 3 illustrate detailed operation modes of the panel operating apparatus 10 of FIG. 1. Specifically, FIG. 2 shows a touch type operation mode (hereinafter referred to as a "touch mode") of the panel operating apparatus 10 in which pressure is applied to the panel 16 to such a degree as to cause slight contact between the panel 16 and the resilient member 12 as indicated by "TOUCH" in FIG. 2, and FIG. 3 shows a tact type operation mode (hereinafter referred to as a "tact mode") of the panel operating apparatus 10 in which pressure is applied to the panel 16 to such a degree as to cause contact between the resilient member 12 and the tact member 16 as indicated by "PRESS" in FIG. 3. When compared with FIGS. 2 and 3, it can be appreciated that FIG. 1 shows the panel operating apparatus 10 in the non-operation state.

First, referring to FIGS. 1 and 2, in the non-operation state, the resilient member 12 is separated both from the panel 16 and the tact member 14 as shown in FIG. 1. Then, when a pressure "TOUCH" is applied to the panel 16 by a finger "f" of an operator, a portion 16a of the panel 16 is compressed and brought into contact with the resilient member 12 so that a state of the display device (not shown) electrically connected to the panel operating apparatus 10 is changed by a series of post-processes.

Here, the display device (not shown) may be any of various display devices such as a liquid crystal display (LCD), a light emitting diode (LED), and a plasma display panel (PDP), and the like.

Then, referring to FIG. 3, when a pressure "PRESS" is applied to the panel 16 by a finger "f" of an operator to cause contact between the resilient member 12 and the tact member 14, the state change of the display device (not shown) is performed in a tact manner.

FIG. 4 is a side sectional view of a panel operating apparatus 20 including a different resilient member from the resilient member shown in FIG. 1. In the panel operating apparatus 20, a resilient member 22 has a flat dome shape, the center 22a of which has a predetermined flat region. However, it should be understood that such a shape of the resilient member 22 is one example of the resilient member according to the present disclosure. The flat dome shape of the resilient member 22 facilitates contact between a pad 26 and the resilient member 22 as compared with the shape of the resilient member 12 shown in FIG. 1.

Figure 5:
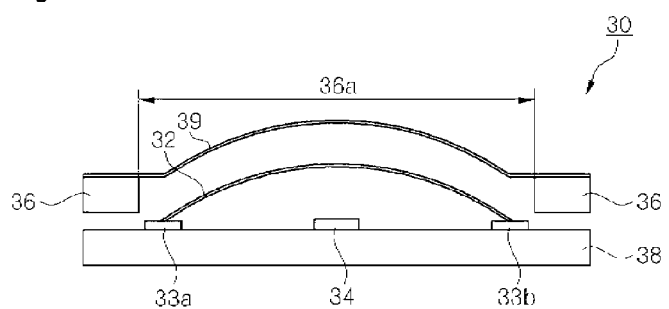
FIG. 5 is a side sectional view of a panel operating apparatus in accordance with another embodiment of the present disclosure.

FIG. 5 is a side sectional view of a panel operating apparatus 30 in accordance with another embodiment of the present disclosure. Referring to FIG. 5, a panel operating apparatus 30 for changing a state of a display device (not shown) electrically connected to a circuit board 38 located below a panel having an opening 36a includes a tact member 34, a thin film 39, and a resilient member 32.

The tact member 34 is mounted on the circuit board 38 and serves as a contact point with the resilient member 32 for changing a state of the display device in operation.

The thin film 39 covers the whole opening 36a and at least a portion of a surface of the panel 36. The thin film 39 may be disposed on the surface of the panel 36 so as to be attached to the surface of the panel 36. The thin film 39 may be convex at a portion thereof that covers the opening 36a.

The resilient member 32 is electrically connected to a circuit pattern (not shown) of the circuit board 38 and disposed to be separated from both the thin film 39 and the tact member 34. The resilient member 32 may be electrically connected to the circuit pattern of the circuit board 38 via solders 33a and 33b on the circuit board 38.

When pressure is applied to the thin film 39 of the apparatus 30 with the thin film 39, resilient member 32 and tact member 34 disposed as above, the resilient member 32 may be selectively brought into contact with the panel 36 or the tact member 34 depending on a degree of the pressure applied to the thin film 39.

Similar to the touch mode shown in FIG. 2, a touch mode in this embodiment occurs when the thin film 39 is brought into contact with the resilient member 32. Further, similar to the tact mode shown in FIG. 3, a tact mode in this embodiment occurs when pressure is applied to the thin film 39 to compress the resilient member 32 so that the resilient member 32 is brought into contact with the tact member 34. Accordingly, the panel operating apparatus according to this embodiment can also be operated in the touch mode or the tact mode by a user to change the state of the display device.

Figure 6:
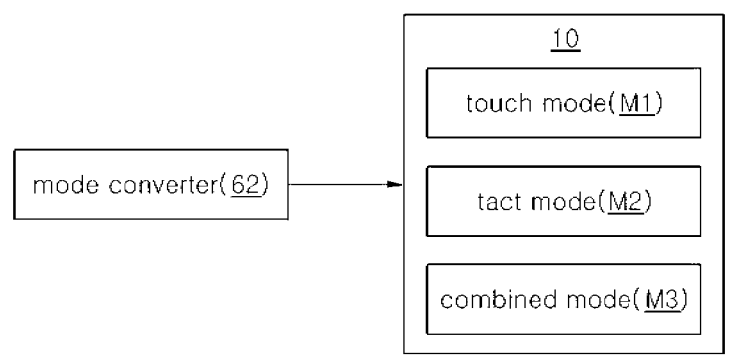
FIG. 6 is a block diagram of a mode converter of the panel operating apparatus in accordance with one embodiment of the present disclosure.

FIG. 6 is a block diagram of a mode converter 62 of the panel operating apparatus in accordance with one embodiment. Referring to FIGS. 1 to 3 and 6, the mode converter 62 converts an operating mode of the panel operating apparatus into a touch mode M1, a tact mode M2 or a combined mode M3 of the touch type and tact type operation modes depending on external pressure applied thereto.

For example, in the touch mode M1 of the panel operating apparatus 10 as shown in FIG. 2, the panel 16 is brought into contact with the resilient member 12 so that the state of the display device (not shown) is changed in the touch manner by the apparatus 10. In this case, if the pressure applied to the panel 16 increases to cause contact between the resilient member 12 and the tact member 14, the apparatus 10 is not operated in the tact manner.

Further, in the tact mode M2 of the panel operating apparatus 10 as shown in FIG. 3, the resilient member 12 is brought into contact with the tact member 14 so that the state of the display device (not shown) is changed in the tact manner by the apparatus 10. In this case, if the pressure applied to the panel 16 decreases to cause only the contact between the resilient member 12 and the panel 16, the apparatus 10 is not operated in the touch manner.

The apparatus may be manipulated to operate only in one mode of the touch mode M1 and the tact mode M2 by the mode converter 62, for example, in the case where an operation state (for example, temperature) is abruptly changed to cause frequent operation errors in the touch mode due to malfunction of ICs or other circuits constituting the panel operating apparatus or in the case where there is an operation error in the tact mode M2 by the tact member 14. In the former case, the mode converter 62 converts the operation mode of the apparatus into the tact mode M2 so that the apparatus is operated only in the tact manner, and in the latter case, the mode converter 62 converts the operation mode of the apparatus into the touch mode M1 so that the apparatus is operated only in the touch manner.

As shown in FIGS. 1 to 3, the mode converter 62 may convert the operation mode of the panel operating apparatus into the combined mode M3. In this mode, the apparatus can be operated in the touch mode M1 or in the tact mode M2 depending on a degree of pressure applied to the panel 16 of the apparatus.

The various embodiments described above can be combined to provide further embodiments. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A panel operating apparatus, comprising:
   a panel;
   a tact member arranged on a circuit board located adjacent to the panel; and
   a resilient member electrically connected to a circuit pattern of the circuit board, the resilient member being separated from the panel and the tact member, the resilient member configured to be selectively brought into direct contact with the panel only or both the panel and the tact member depending on a degree of pressure applied to the panel, wherein the panel operating apparatus is configured to change a state of a device electrically connected thereto in response to the resilient member being in direct contact with the panel only in a first operation mode.

2. The panel operating apparatus of claim 1, wherein the resilient member comprises a dome shape.

3. The panel operating apparatus of claim 1, wherein the resilient member comprises a flattened dome shape, wherein a center portion of the resilient member comprises a flattened region.

4. The panel operating apparatus of claim 1 wherein the resilient member is soldered to the circuit board.

5. The panel operating apparatus of claim 1, wherein the panel operating apparatus is configured to change the state of the device electrically connected thereto in response to the resilient member being in contact with the tact member in a second operation mode.

6. The panel operating apparatus of claim 1, wherein the device is a display device electrically connected to the circuit board located below the panel.

7. A panel operating apparatus, comprising:
a panel having an opening;
a circuit board located adjacent to the panel;
a tact member arranged on the circuit board in a region of the opening in the panel;
a thin film covering the opening and at least a portion of a surface of the panel; and
a resilient member arranged in the region of the opening, the resilient member electrically connected to a circuit pattern of the circuit board and being separated from the thin film and the tact member, the resilient member configured to be selectively brought into direct contact with the panel only or both the panel and the tact member depending on a degree of pressure applied to the thin film,
wherein the panel operating apparatus is configured to change a state of a display device electrically connected to the circuit board in response to the resilient member directly contacting the panel only in a first operation mode.

8. The panel operating apparatus of claim 7, wherein the thin film is convex at a portion thereof that covers the opening.

9. The panel operating apparatus of claim 8, wherein the resilient member is soldered to the circuit board.

10. The panel operating apparatus of claim 7, wherein the resilient member comprises a dome shape.

11. The panel operating apparatus of claim 7, wherein the resilient member comprises a flattened dome shape, wherein a center portion of the resilient member comprises a flattened region.

12. The panel operating apparatus of claim 7, wherein the resilient member is soldered to the circuit board.

13. The panel operating apparatus of claim 7, wherein the panel operating apparatus is further configured to change the state of the device electrically connected thereto in response to the resilient member being in contact with the tact member in a second operation mode.

14. An apparatus, comprising:
a circuit board;
a tact member disposed on the circuit board;
a resilient member electrically connected to the circuit board and spaced apart from the tact member;
a contact member comprising a portion of a panel disposed above the circuit board, the contact member being configured to be spaced apart from the resilient member at a first position, to directly contact the resilient member without the resilient member contacting the tact member in response to a first touch event, and to contact the resilient member with the resilient member contacting the tact member in response to a second touch event,
wherein the circuit board is configured to change a state of a device electrically connected thereto in response to the contact member directly contacting the resilient member only, without the resilient member contacting the tact member in a first operation mode.

15. The apparatus of claim 14, wherein the contact member further comprises a film, the film being disposed at an opening of a panel disposed above the circuit board.

* * * * *